(No Model.)
D. W. FROST.
CROCK COVER.
No. 292,110. Patented Jan. 15, 1884.
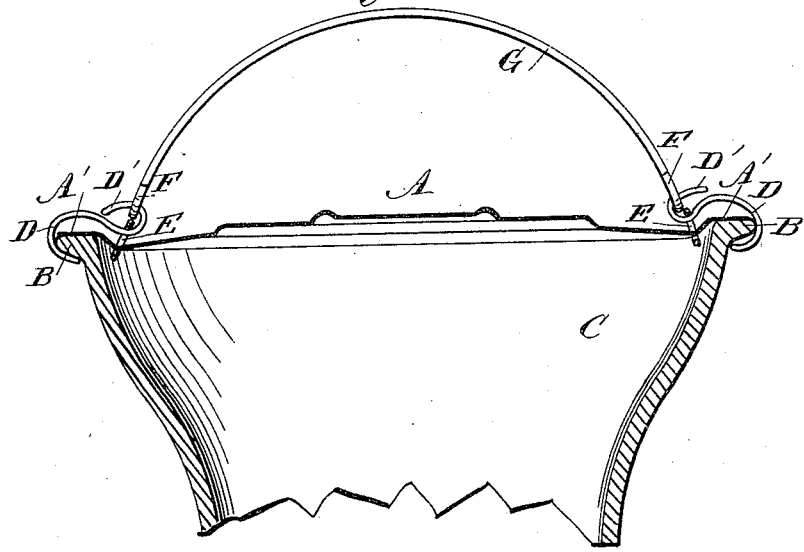
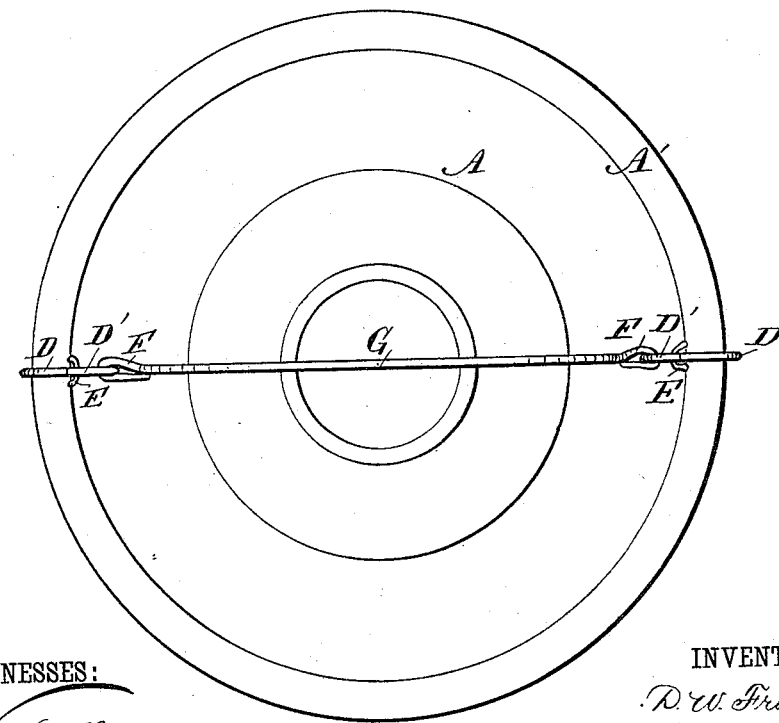
WITNESSES:
C. Neveux
C. Sedgwick
INVENTOR:
D. W. Frost
BY Munn & Co
ATTORNEYS.

UNITED STATES PATENT OFFICE.

DANIEL WEBSTER FROST, OF KEOKUK, IOWA.

CROCK-COVER.

SPECIFICATION forming part of Letters Patent No. 292,110, dated January 15, 1884.

Application filed November 8, 1883. (No model.)

*To all whom it may concern:*

Be it known that I, DANIEL W. FROST, of Keokuk, Lee county, Iowa, have invented a new and Improved Crock-Cover, of which the following is a full, clear, and exact description.

The object of my invention is to provide a new and improved crock-cover provided with recesses for holding it on the crock in such a manner that the bail of the cover can be used to lift the crock, and which can be adjusted to fit any crock.

The invention consists in a cover, to two opposite points of which hooks are held by wire loops or staples, on the inner ends of which hooks the ends of the bail are held.

Reference is to be had to the accompanying drawings, forming part of this specification, in which similar letters of reference indicate corresponding parts in all the figures.

Figure 1 is a longitudinal sectional elevation of the upper part of a crock with my improved cover, and Fig. 2 is a plan view of the same.

A circular cover, A, is provided along its edge with a flattened rim, A', fitting on the edge-bead B, formed on the upper end of the crock C. At diametrically-opposite points hooks D, made of spring-wire, are held on the cover by wire loops E or by staples, which hooks D have the inner ends bent to form hooks D' which pass through the loops or staples E. The hooks D can be made single or double, and must be made large enough to adapt them to pass over the bead B. The upper or inner hooks, D', are passed through eyes or loops F, formed on the end of a bail, G. The hooks D are thus held on the ends of the bail, and the cover is suspended from the end of the bail by the wire loops or staples E and the hooks D D'. The cover can be made of wood, metal, &c. The hooks D can be bent outward or enlarged if the bead B is thick, or can be bent inward and decreased if the size of the bead B is small. The cover A is placed on the crock, stew-pan, &c., and the hooks D are passed over the bead, as shown, under which bead they catch, thus permitting of lifting and carrying the crock by means of the bail, as the hooks D are in direct connection with the bail. If the cover is to be removed, the hooks are withdrawn from under the bead, and the bail can be used to lift and carry the cover.

Having thus described my invention, I claim as new and desire to secure by Letters Patent—

1. The combination, with the cover A, bail G, and hooks D, of the staples E, connecting the hooks and cover, as and for the purpose specified.

2. The combination, with a cover, A, of the bail G. the loops or staples E in the cover, and of the hooks D, having hook ends D', passed through the loops E and through the loops on the ends of the bail, substantially as herein shown and described.

3. The combination, with a cover, of loops fastened on the same, hooks passed through the loops and through loops on the end of the bail, whereby the cover will be secured to the bail by means of the loops or staples and the hooks, substantially as herein shown and described.

DANIEL WEBSTER FROST.

Witnesses:
HARRISON TUCKER,
JOHN W. CARVER.